3,321,476
PROCESS FOR PREPARING 2,4-DIAMINO-s-TRI-
AZINE-2-YL GUANIDINE SALTS
Daniel Elmer Nagy, Stamford, Conn., assignor to American Cyanamid Company, Stamford, Conn., a corporation of Maine
No Drawing. Filed Jan. 28, 1965, Ser. No. 428,875
5 Claims. (Cl. 260—249.6)

This invention relates to the preparation of 4,6-diamino-s-triazine-2-yl guanidine and to the acid salts thereof.

U.S. Patent 2,537,840 to MacLean discloses a method of preparing trianzyl guanidines by treating dicyandiamide with dry hydrogen halide in a solvent medium followed by separation of the products from the reaction mass. The latter process provides a reaction product mixture containing a predominant amount of the hydrohalide of 2,4-diamino-s-triazine-2-yl guanidine (hereinafter called monoguanidinodiamino triazine or MGDT) and lesser amounts of the hydrohalides of 1,1'-(6-amino-s-triazine-2,4-diyl)diguanidine and 1,1',1''-s-triazine-2,4,6-triyltriguanidine (hereinafter called diguanidinoamino triazine, or DGAT, and triguanidino triazine, or TGT, respectively). However, the method is relatively expensive since it requires gaseous hydrogen halide, a substantially anhydrous reaction medium and the use of nonaqueous solvents. Moreover, the non-aqueous solvents employed are often flammable and/or toxic, thereby adding to the potential hazards of the process. In addition, the process tends to form gelatinous by-products which makes filtration extremely difficult and special apparatus is required to avoid loss of the gaseous hydrogen halide and to reduce the toxicity hazard of the solvents. And further, substantial amounts of the DGAT and TGT hydrohalides are formed at the expense of high yields of MGDT hydrohalide and it is desirable to recover solvent for economy.

It has now been discovered that MGDT hydrohalides can be prepared in high yields by a simple, inexpensive procedure which does not require an anhydrous medium and which avoids the substantial disadvantages mentioned above. The process of the present invention comprises adding concentrated hydrogen halide to dicyandiamide and reacting to form 4,6-diamino-s-triazine-2-yl guanidine hydrohalide the structure of which may be written as follows:

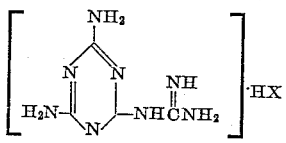

wherein X is a halogen, e.g., chlorine, bromine or fluorine.

By "concentrated hydrogen halide" is meant water solutions containing from about 25% to 37% by weight of a hydrogen halide acid, e.g., HCl, HBr, HF or mixtures thereof. Such solutions are readily available commercially, thereby enhancing the convenience and economy of the present process. Dicyandiamide, of course, is also a commercially available material.

It is critical to the success of the process that the hydrogen halide solution be added to the dicyandiamide rather than the reverse. This will avoid hydrolysis of the dicyandiamide to guanylurea hydrohalide,

(also called dicyandiamidine hydrohalide). In this connection, the present process gives an unexpected result since it is well known that dicyandiamide is quantitatively hydrolyzed to guanylurea hydrohalide in the presence of water and acid. See Pranke, Cyanamide, p. 18, Chemical Rubber Publishing Company (1913), and British Patent 434,961 to Du Pont Company (1934). In view of this knowledge it is indeed surprising that merely by employing a concentrated reaction mixture and adding acid to dicyandiamide rather than the reverse, the hydrolysis is almost totally suppressed and at least 60% of the dicyandiamide is reacted to form MGDT hydrohalide.

The dicyandiamide:hydrogen halide mol ratio may vary from about 2:1 to 1:2 but preferably will be about 1:1.

The concentrated hydrogen halide may be added directly to dry dicyandiamide or an aqueous slurry of dicyandiamide may first be prepared and then the hydrogen halide solution added. Preferably, the water in the reaction mixture will be kept at a minimum to minimize hydrolysis to undesired guanylurea hydrohalide. Thus, it is preferred to use the most concentrated hydrogen halide solutions available, which are generally about 33% to 37% acid by weight, and to use dry dicyandiamide.

This preference of minimum water content in the reaction mixture will at once suggest alternate continuous, semi-continuous and batch procedures to those skilled in the art. All of such modifications are, of course, encompassed by the present invention.

As an example of a continuous process, an aqueous suspension of dicyandiamide may first be prepared, to which is continuously added the concentrated hydrogen halide while simultaneously and continuously reacting, adding more reactants, distilling off the water, and separating reaction products. Another continuous procedure would be to pass dry dicyandiamide continuously, as on a moving belt, below an orifice from which is emitted highly concentrated hydrogen halide solution at a rate and temperature designed to provide optimum contact of reactants and maximum yield of product.

A semi-continuous procedure is also feasible. For example, a slurry of a portion of the dicyandiamide may first be prepared, to which is then added further portions of dicyandiamide and then portions of concentrated hydrogen halide solution, while continuously vacuum distilling off water to keep the reaction mixture as concentrated as possible. After a few minutes reaction, a portion of the reaction mixture is withdrawn and the guanylamino-s-triazine hydrohalide products separated. This withdrawal is followed by addition of further portions of dicyandiamide and concentrated hydrogen halide to the reaction mixture and the process of reaction, withdrawal and separation is repeated as often as desired.

The reaction times and temperatures of the process of the invention may vary considerably and optimum conditions may easily be determined, given the present disclosure. Thus, for most preparations, particularly batch processes, conditions may be from about 60° C. to 180° C., preferably 80° C. to 140° C., for from about several minutes, e.g., 10 minutes, up to several hours, e.g., 2 or 3 hours. Of course, continuous or semi-continuous procedures, wherein water is continuously distilled from the reaction mixture, will be preferred for commercial production. The conditions for these procedures will preferably be further limited, e.g., reaction temperature of from about 90° C. to 105° C., and contact time of from about several seconds up to 30 minutes or an hour. Atmospheric, subatmospheric and superatmospheric pressures may also be employed, with suitable corresponding modifications in temperature and apparatus.

No solvents other than the water present in the hydrogen halide solution are required for the process. This is a distinct advantage over the prior art methods.

The process of the invention gives as the major constituent the desired MGDT hydrohalide and, as a by-product, guanylurea hydrohalide. For many commercial applications, the crude product mixture will be useful and it will be unnecessary to separate the two constituents. If it is desired to separate the MGDT product from the guanylurea hydrohalide this is easily done since the MGDT product is relatively insoluble in cold water especially if some common salt is added such as sodium halide. The guanylurea hydrohalide is extremely water soluble and passes into the filtrate when the mixture is filtered. In certain cases it may be desirable to precipitate the MGDT product as the insoluble sulfate or phosphate salts which are also quite insoluble in water. In any event, separation and purification procedures are conventional and include such well known techniques as salting out followed by filtration, extraction, fractional crystallization, separation of the reaction products by alkaline precipitation with specific reagents, and the like.

The MGDT hydrohalide product may be easily obtained in the free base form by reacting the hydrohalide with a strong base such as sodium hydroxide, potassium hydroxide or calcium hydroxide, followed by separation.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

*Batch process*

| | Parts |
|---|---|
| Dicyandiamide (0.3 mol) | 25.2 |
| Concentrated HCl (37%) (0.17 mol) | 17 |
| Water | 10 |

The dicyandiamide and the water is heated to 112° C. and the hydrochloric acid added dropwise during 30 minutes. The mixture becomes a slightly cloudy solution. Analysis shows that 46% of the dicyandiamide is converted to 4,6-diamino-s-triazine-2-yl-guanidine hydrochloride.

EXAMPLE 2

*Semi-continuous process*

| | Parts |
|---|---|
| Dicyandiamide (1.19 mols) | 100 |
| Concentrated HCl (37%) (1.22 mols) | 122 |

A small amount of water is added to the dicyandiamide in a reaction vessel which is heated by steam at 95–105° C. Vacuum is applied and the 122 parts of acid is added at such a rate that the distilling keeps the volume essentially constant. This requires 15 minutes. The mix is heated 15 minutes longer until the temperature drops from 100° C. to 96° C. indicating that the exotherm is over.

This process is repeated and when a sufficient heel has been built up in the reaction vessel a portion is withdrawn so as to keep the volume constant, before the next portion of dicyandiamide is added. The crude product is a mixture predominating in 4,6-diamino-s-triazine-2-yl guanidine hydrochloride and can be used as is or the MGDT salt can be precipitated in purified form by adding water and heating to form a solution, filtering from the trace of insolubles and precipitating the product by cooling or preferably by adding some sodium chloride, and then cooling to give a more easily filterable product. The yield of MGDT salt is about 65% based on initial weight of dicyandiamide.

EXAMPLE 3

*Continuous procedure*

Dicyandiamide is placed in a thin layer on a belt which is stable to heating at 130° C. and inert to concentrated HCl. The belt is passed under a series of six to eight nozzles which spray concentrated HCl onto the dicyandiamide. The belt speed and the rate of HCl spraying are so adjusted that a total of approximately 1 mol of the acid is added to each 2 mols of dicyandiamide as it passes along. The spray nozzles are arranged so that the hot (130–140° C.) layer of dicyandiamide becomes dry from the first spray before it is treated with the second spray and similarly with the other sprays. The final dry product, crude MGDT hydrochloride, is suitable for many uses or it can be purified as outlined above.

EXAMPLE 4

*Preparation of free base*

203 parts of 4,6-diamino-s-triazine-2-yl guanidine hydrochloride monohydrate is slurried in 300 parts of water at 50° C. for 15 minutes. Then 40 parts of sodium hydroxide in 210 parts of water is added which gives a clear solution after 15 minutes.

The clear solution is cooled to 7° C. and after a few minutes crystals of the free base begin to precipitate. When crystallization is complete, the solid is filtered and weighed to give 201 parts wet and 140 parts when vacuum dried at 55–60° C.

The ultraviolet absorption spectra of the product indicates that the product is 96% pure. The neutralization equivalent is found to be 169 and when calculated is 168.

In other preparations employing concentrated aqueous HBr or HF acids and following substantially the same procedures as in Examples 1–4, substantially the same results are obtained.

COMPARATIVE EXAMPLE

*The effect of adding dicyandiamide to dilute HCl*

| | Parts |
|---|---|
| Water | 1,500 |
| Dicyandiamide (6 mols) | 504 |
| Concentrated HCl (6 mols) | 600 |

The acid and water are heated to 95° C. and the dicyandiamide is added slowly during about 1.5 hours at 95–105° C. The clear solution is evaporated to dryness to give a yield of 813 parts (98%) of guanylurea hydrochloride. By adding dilute HCl to dry dicyandiamide or an aqueous slurry of dicyandiamide, the effect is substantially the same, demonstrating that both concentrated acid and adding acid to dicyandiamide are critical for preparation of MGDT hydrochloride.

I claim:

1. A process for preparing 4,6-diamino-s-triazine-2-yl guanidine hydrohalide which comprises adding concentrated hydrogen halide to dicyandiamide and reacting.

2. A process for preparing 4,6-diamino-s-triazine-2-yl guanidine hydrohalide which comprises adding concentrated hydrogen halide to dicyandiamide and reacting at a temperature of from about 60° C. to 180° C.

3. A process for preparing 4,6-diamino-s-triazine-2-yl guanidine hydrohalide which comprises added concentrated hydrogen halide to an aqueous dispersion of dicyandiamide and reacting at a temperature of from about 80° C. to 140° C.

4. A process for preparing 4,6-diamino-s-triazine-2-yl guanidine hydrochloride which comprises adding concentrated hydrogen chloride to dicyandiamide and reacting at a temperature of from about 60° C. to 180° C.

5. A process for preparing 4,6-diamino-s-triazine-2-yl guanidine hydrochloride which comprises adding concentrated hydrogen chloride to an aqueous dispersion of dicyandiamide and reacting at a temperature of from about 80° C. to 140° C.

References Cited by the Examiner

UNITED STATES PATENTS 2,537,840    1/1951    MacLean _____ 260—249.6

WALTER A. MODANCE, *Primary Examiner.*

JOHN M. FORD, *Assistant Examiner.*